E. HILL.
PISTON FOR OXYGEN COMPRESSORS.
APPLICATION FILED APR. 5, 1921.

1,386,333.

Patented Aug. 2, 1921.

INVENTOR
Ebenezer Hill
BY
Harry R. Williams
ATTORNEY

UNITED STATES PATENT OFFICE.

EBENEZER HILL, OF NORWALK, CONNECTICUT.

PISTON FOR OXYGEN-COMPRESSORS.

1,386,333. Specification of Letters Patent. Patented Aug. 2, 1921.

Application filed April 5, 1921. Serial No. 458,849.

*To all whom it may concern:*

Be it known that I, EBENEZER HILL, a citizen of the United States, residing at Norwalk, in the county of Fairfield and State of Connecticut, have invented a new and useful Improvement in Pistons for Oxygen-Compressors, of which the following is a specification.

Pistons of oxygen compressors are ordinarily lubricated with soap and water or water alone as oleaginous lubricants deleteriously affect the gas, and the pistons of these machines commonly are flat on top and are packed with cups or disks made of fiber compounds. If a fiber cup is used it soon is crushed down and the corners become sharp, while of course, if a disk is used the corners are normally square. When such packings are allowed to stand idle for a time the fiber becomes dried out and when the machine is started up again and lubricated the water expands the packing and forces it out in the plane of the body of the packing tightly against the wall of the cylinder and makes the compressor run hard. It is then necessary to put in a new fiber cup or flat packing which has been soaked for some time in a mold that holds it in the shape it should be on the piston to be most efficient.

The object of this invention is to so shape the piston head, packing plate and packing for such a compressor that it will not bind in the cylinder when it expands and thus add to the load on the machine.

This object is attained by constructing the end of the piston and the packing plate in such manner and so shaping the fiber packing that when the packing expands its outer edge is directed longitudinally of the piston against the wall of the cylinder and will not be forced radially out against the wall of the cylinder in the plane of the greatest mass of the fiber, thus permitting the packing to make a close joint without excessive bind.

Figure 1:
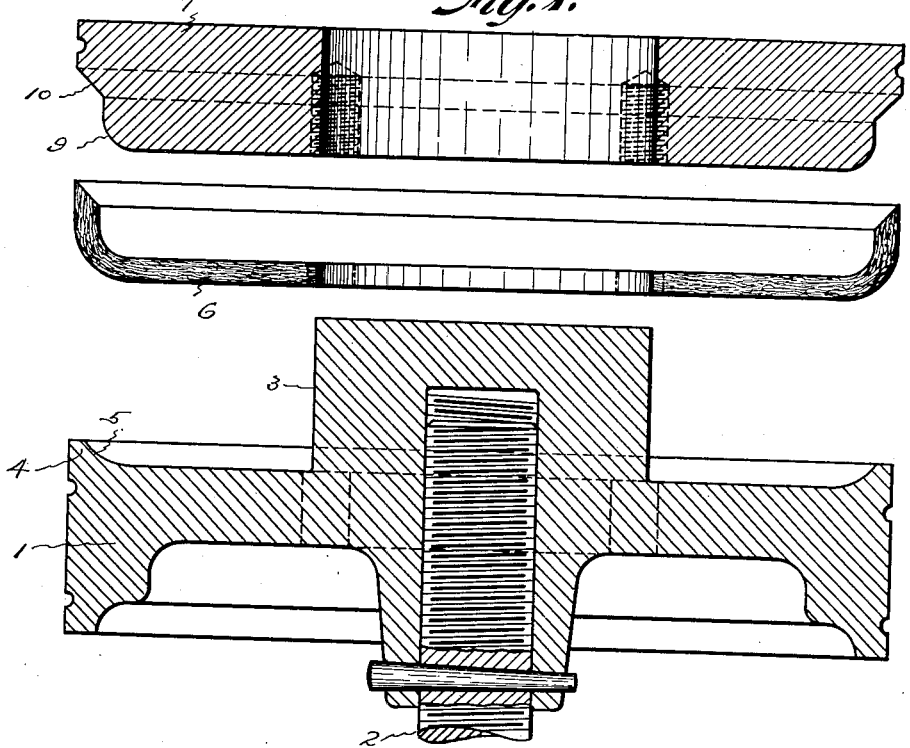
Figure 2:
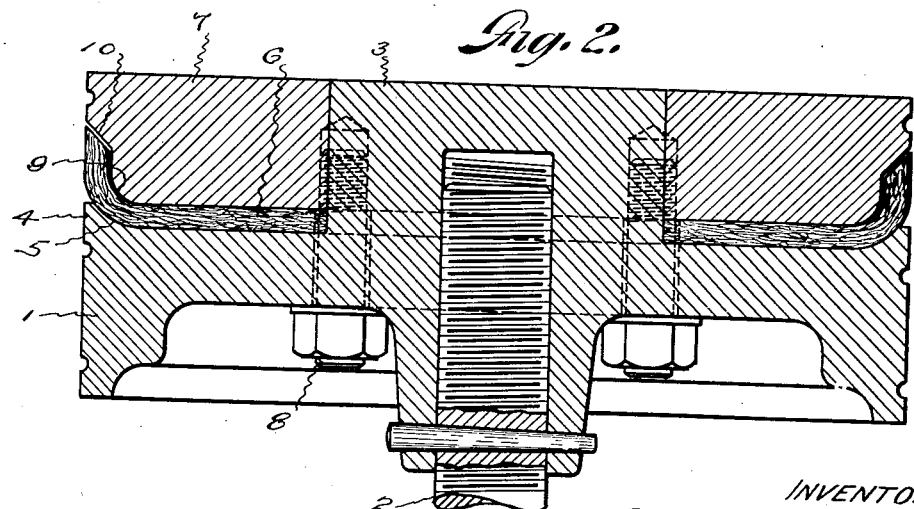

In the accompanying drawings Figure 1 shows the piston, packing and packing plate constructed according to this invention, disassembled. Fig. 2 shows the same parts assembled.

The piston 1 has common means for connecting it to the piston rod 2, and a hub 3 projecting from the center of its working face. Around the outer edge of the working face of the piston is a ridge or lip 4 that is conveniently formed by recessing the working face of the head of the piston. The inner wall 5 of this lip is shaped so as to turn whatever is forced radially against it around into a direction that is parallel with the outer surface of the piston. This inner wall of the lip is preferably curved as illustrated in the drawing. The packing 6 which is shown is a fiber cup shaped to set upon the face of the piston about the hub and to fit the inner wall of the lip so that when the packing expands its outer edge will be directed against the wall of the cylinder longitudinally of the axis of the piston. The packing plate 7 is fitted upon the piston head and secured by studs and nuts 8. The inner corner 9 about the edge of the plate is curved to fit into the cup and the section 10 of the edge of the plate is inclined so as to direct the beveled edge of the packing outward. A slight clearance is desirably left between the inclined portion of the edge of the plate and the inner wall near the edge of the packing to permit the cup to expand and also to admit fluid pressure which will force the edge of the cup out against the wall of the cylinder.

When the working face of the piston is provided with a lip having a sloping or curved inner wall as shown as the fiber cup expands its edge is diverted or turned lengthwise of the piston, but the force of the gas being compressed holds the edge of the packing out against the wall of the cylinder, thus making the cup pack sufficiently tight but with an easy fit that endures.

The invention claimed is:

A piston for an oxygen compressor comprising a piston head having a lip with an outwardly curved inner wall around the edge of its wearing face, a cup packing formed of indurated fiber which expands when moistened and contracts when dried fitting the working face of the head, and a packing plate with a curved inner corner fitted within and protecting the cup packing, fastened to the head, the space between the outwardly curved inner wall of the lip on the head and the curved inner corner of the packing plate being shaped to direct the edge of the cup so that it will extend longitudinally of the piston without crushing at the bend when the cup becomes moistened and expands, and when the cup dries permit it to contact without breaking at the bend and direct the edge of the cup radially outward so it will keep close contact with the wall of the cylinder in which the piston operates.

EBENEZER HILL.